United States Patent
Riedel et al.

(10) Patent No.: US 9,013,348 B2
(45) Date of Patent: Apr. 21, 2015

(54) RADIOMETRIC IMAGING DEVICE AND CORRESPONDING METHOD

(75) Inventors: Matthias Riedel, Stuttgart (DE); Marcel Daniel Blech, Herrenberg (DE)

(73) Assignee: Sony Corporation, Tokyo (JP)

(*) Notice: Subject to any disclaimer, the term of this patent is extended or adjusted under 35 U.S.C. 154(b) by 445 days.

(21) Appl. No.: 13/105,423

(22) Filed: May 11, 2011

(65) Prior Publication Data

US 2011/0279308 A1 Nov. 17, 2011

(30) Foreign Application Priority Data

May 12, 2010 (EP) .................................... 10162702

(51) Int. Cl.
- G01S 13/88 (2006.01)
- G01S 13/89 (2006.01)
- G01S 11/06 (2006.01)

(52) U.S. Cl.
CPC .............. *G01S 13/887* (2013.01); *G01S 11/06* (2013.01); *G01S 13/89* (2013.01)

(58) Field of Classification Search
USPC ........................................................ 342/351
IPC .. G01S 11/06,13/88, 13/887, 13/89; H04N 5/33
See application file for complete search history.

(56) References Cited

U.S. PATENT DOCUMENTS

| 4,071,752 | A | * | 1/1978 | Manning .................. 250/214 VT |
|---|---|---|---|---|
| 4,282,527 | A | * | 8/1981 | Winderman et al. .......... 343/725 |
| 4,283,588 | A | * | 8/1981 | Zitzelsberger ................ 136/246 |
| 5,148,209 | A | | 9/1992 | Subbarao |
| 5,734,578 | A | * | 3/1998 | Oh ................................... 702/77 |
| 5,933,120 | A | * | 8/1999 | Manasson et al. ............ 343/788 |
| 2003/0002746 | A1 | * | 1/2003 | Kusaka ......................... 382/255 |
| 2007/0221847 | A1 | | 9/2007 | Lettington et al. |
| 2007/0257188 | A1 | | 11/2007 | Robertson et al. |
| 2009/0066818 | A1 | * | 3/2009 | Lim et al. ...................... 348/252 |
| 2010/0002086 | A1 | * | 1/2010 | Chien et al. ................ 348/208.2 |
| 2010/0073518 | A1 | * | 3/2010 | Yeh .......................... 348/231.99 |
| 2011/0181461 | A1 | | 7/2011 | Sarkis |

(Continued)

FOREIGN PATENT DOCUMENTS

| EP | 2 355 040 A2 | 8/2011 |
|---|---|---|
| WO | WO 2005/026674 A2 | 3/2005 |
| WO | WO 2008/135995 A2 | 11/2008 |

OTHER PUBLICATIONS

Infrared (IR). (2001). In Hargrave's communications dictionary, Wiley. Retrieved from http://search.credoreference.com/content/entry/hargravecomms/infrared_ir/0.*

(Continued)

*Primary Examiner* — Gregory C Issing
*Assistant Examiner* — Fred H Mull
(74) *Attorney, Agent, or Firm* — Oblon, McClelland, Maier & Neustadt, L.L.P.

(57) ABSTRACT

A radiometric imaging device and a corresponding method for scanning a scene. The device comprises a radiometer configured to detect radiation in a predetermined spectral range emitted from said scene and to generate a radiation signal from said detected radiation, and a processor configured to process said generated radiation signal by de-convoluting said generated radiation signal by use of a distance-dependent de-blur kernel, which is determined depending on the distance between said scene and the radiometer.

19 Claims, 9 Drawing Sheets

(56) References Cited

U.S. PATENT DOCUMENTS

2011/0267507 A1* 11/2011 Kane et al. .................... 348/241
2012/0086794 A1* 4/2012 Burcham et al. ................ 348/77

OTHER PUBLICATIONS

Radiometer. (2011). In the american heritage(R) dictionary of the english language. Retrieved from http://search.credoreference.com/content/entry/hmdictenglang/radiometer/0.*
Radiometer. (2000). In Collins English Dictionary. Retrieved from http://search.credoreference.com/content/entry/hcengdict/radiometer/0.*
With. (2000). In Collins English Dictionary. Retrieved from http://search.credoreference.com/content/entry/hcengdict/with/0.*
Ran Kaftory et al., "Variational Distance-Dependent Image Restoration," http://citeseerx.ist.psu.edu/viewdoc/summary?doi=10.1.1.98. 4789, IEEE Conference on Computer Vision and Pattern Recognition, CVPR, Jun. 17-22, 2007, 8 pages.
Roger F. Harrington, "Effect of antenna size on gain, bandwidth, and efficiency," Journal of Research of the National Bureau of Standards, Section D, Radio Science, vol. 64D, No. 1, Jan.-Feb. 1960, 13 pages.
J.E. Hansen, Spherical Near-Field Antenna Measurements, Institution of Engineering and Technology, IEE Electromagnetic Waves Series 26, 1988, 201 pages.
Constantine A. Balanis, "Antenna Theory—Analysis and Design," $3^{rd}$ Ed., Wiley-Interscience, 2005, p. Title-333 and 385-1050.
Extended European Search Report issued Oct. 4, 2011, in Patent Application No. 11161859.1.
Ben-qing Wang, et al., "Near Range Millimeter Wave Radiometer Passive Image High Resolution Restoration", Global Symposium on Millimeter Waves, GSMM, XP 31266757, Apr. 21, 2008, pp. 325-328.

* cited by examiner

| Detection probability [in %] | | | | | | |
|---|---|---|---|---|---|---|
| 10dB SNR | | | convolution | | | |
| Wiener 100 | Antenna Pattern | 1 | 2 | 3 | 4 |
| | | 1 | 89 | 16 | 1 | 0 |
| | | 2 | 3 | 94 | 93 | 92 |
| | | 3 | 1 | 88 | 94 | 94 |
| deconvolution | | 4 | 0 | 80 | 93 | 93 |

FIG. 8

RADIOMETRIC IMAGING DEVICE AND CORRESPONDING METHOD

CROSS-REFERENCE TO RELATED APPLICATIONS

The present application claims priority of European patent application 10162702.4 filed on May 12, 2010.

FIELD OF THE INVENTION

The present invention relates to a radiometric imaging device and a corresponding method for scanning a scene. Further, the present invention relates to a computer readable non-transitory medium comprising said computer program.

BACKGROUND OF THE INVENTION

Radiometric imaging in the context of the present invention relates primarily (but not exclusively) to the field of millimeter wave imaging. Millimeter waves are radio waves in the wavelength range from approximately 1 mm to 10 mm, which corresponds to a frequency range from approximately 30 GHz to 300 GHz. These waves have been applied to in-vehicle radar devices for measuring the distance between moving vehicles in order to prevent collisions and to high speed wireless communications for achieving transmission data rate in the order of several gigabits per second. Further, improved generation and detection techniques as well as latest improvements in the integration and miniaturization of devices operating in the millimeter wave frequency range have created a lot of interest to exploit the properties of this electromagnetic radiation. Its ability to penetrate non-conducting materials, including plastics, walls, clothes, smoke and fog have provided additional momentum to research on millimeter waves imaging applications. Furthermore, the achievable spatial resolution of few millimeters is very interesting in security applications, such as airport security scanners for the detection of concealed weapons or explosives.

The millimeter waves can be used in an active or a passive way. A passive radiometric imaging system creates images by capturing the electromagnetic radiation emitted by the objects by using a radiometer. A radiometric body scanner, for example, detects the millimeter waves which are naturally emitted by the human body in order to reconstruct an image of the body contours. A radiometric body scanner is, however, not limited to reconstructing an image of the contours of the body itself, but may also image the entire surface of the body like in an ordinary picture. Such a passive radiometric imaging system is, for instance, known from US 2007/0221847 A1. An active radiometric imaging system, on the other hand, illuminates objects with millimeter waves and creates images by detecting the transmitted or reflected waves. Millimeter waves do not produce ionizing effects, which makes this technology an attractive candidate to be employed in security applications like concealed weapon or explosives detection, while existing technologies based on infrared or visible radiation cannot detect concealed objects, and X-ray based systems cannot be used due to its ionizing effect.

SUMMARY OF THE INVENTION

It is an object of the present invention to provide a radiometric imaging device for imaging a scene with an improved image quality containing less blurring artifacts compared to state of the art devices by still keeping the technical design of the radiometer as simple as possible. It is a further object of the present invention to provide a corresponding method as well as a corresponding computer program for implementing said method on a computer.

According to an aspect of the present invention there is provided a radiometric imaging device for imaging a scene, said device comprising:

a radiometer configured to detect radiation in a predetermined spectral range emitted from said scene and to generate a radiation signal from said detected radiation, and a processor configured to process said generated radiation signal by deconvoluting said generated radiation signal by use of a distance-dependent de-blur kernel, which is determined depending on the distance between said scene and the radiometer.

According to a further aspects of the present invention there is provided a corresponding radiometric imaging method.

According to a still further aspect of the present invention there is provided a computer readable non-transitory medium having instructions stored thereon which, when carried out on a computer, cause the computer to perform the steps of said radiometric imaging method according to the present invention.

Preferred embodiments of the invention are defined in the dependent claims. It shall be understood that the claimed method and the claimed computer program and the claimed computer readable medium have similar and/or identical preferred embodiments as the claimed device and as defined in the dependent claims.

It has been found that the pattern of the radiometer, in particular of an antenna of the radiometer, which represents the directional (angular) dependence of the received power detected by the radiometer, strongly depends on the so-called stand-off distance, which is the distance between the scene to be imaged and the radiometer. This dependency has shown to be especially strong when the imaged scene is located in the non-reactive near-field region or in the reactive near-field region.

On the other hand high gain antennas with extremely sharp pencil beams are needed in order to obtain high resolution images. Therefore, antennas exhibiting a large electrical size are required. Due to the large electrical size of the antenna, however, it happens to be the case that in most practical applications, e.g. in airport security scanners, the reactive far-field region is much further away than the object (scene) to be scanned. In other words, the object to be scanned is in many applications located in the non-reactive near-field region, where the antenna pattern strongly varies over the stand-off distance. Further, the half-power beam width according to a specific antenna size can normally only be achieved in the far-field. However, using focusing this half-power beam width can also be obtained in the non-reactive near-field.

Nevertheless, conventional radiometric imaging systems known in the art use a constant antenna pattern for an image de-convolution of the generated radiation signal. This has shown to finally result in blurred images, especially when the imaged object is located in the near-field or in cases where the stand-off distance is varying from one imaged object to the next. Thus, the de-convolution has not been efficient and the image quality suffered severely.

Other known imaging systems employ a mechanical focusing in order to avoid the effect of the distance-dependent antenna pattern on the picture quality. Using this focusing technique, the antenna design is adapted to the corresponding stand-off distance where the focused antenna pattern is almost constant for the different measurement distances. This technique either requires a large antenna array comprising many single antenna elements which are steered in terms of amplitude and phase, or it requires a mechanical focusing (similar to optical cameras) which is employed in conjunction with a single feed antenna or a focal plane array consisting of multiple single feed elements. However, this focusing needs a mechanical variation of the antenna structure, which has negative effects on the product cost structure and the mean time before failure (MTBF).

The inventors of the present invention have found a way for significantly improving the acquired image quality by still keeping the realization costs low and avoiding a complicated mechanical variation of the antenna structure. In particular, according to an aspect of the present invention the radiometric imaging device comprises a processor which processes the generated radiation signal by deconvoluting said generated radiation signal by use of a distance-dependent de-blur kernel, which is determined depending on the distance between said scene and the radiometer. In other words, the de-convolution makes use of a de-blur kernel, which is exactly determined by means of simulation or measurement according to the actual distance between the scanned scene and the radiometer. Therefore, a distance-dependent de-blur kernel is used for the de-convolution, rather than using a constant, distance-independent de-blur kernel as this is done in known imaging devices.

The blurring effect which was caused by the above-mentioned stand-off distance dependency can therefore be overcome. Since, as already mentioned, the antenna pattern varies over the stand-off distance, a better image quality can now be obtained by using a de-convolution, which is exactly derived from the antenna pattern corresponding to the respective stand-off distance. By adapting the deconvolution according to the actual stand-off distance a complicating focusing of the antenna is also no longer necessary. In contrast to the above-mentioned millimeter wave imaging techniques known in the art where a constant antenna pattern is used for the de-convolution, a much better de-blurring of the resulting image can be achieved.

The presented de-convolution technique has an especially positive impact on radiometric imaging applications where the object to be scanned is located in the near-field region since the strong distance-dependent variation of the antenna pattern can be compensated by an exact adaptation of the de-convolution according to the actual stand-off distance.

In a practical application, e.g. in an airport security scanner, it would for example be conceivable that the passengers to be scanned are directed through different gates which are placed at any distance (stand-off distance) from the radiometer, so that the image de-convolution is adapted according to these gate-antenna distances.

It has to be noted that the presented de-convolution technique is independent of whether it is used in an active or a passive radiometric imaging device. The present invention therefore relates to an active as well as to a passive radiometric imaging device. The word "emitted" is therefore not only to be understood literally (which would be the case of passive radiometry), but also to be understood in the sense of "reflected", "diffracted", "refracted" or "transmitted" (which would be the case of active radiometry).

Even though it is, as already mentioned, for the practicability of the presented radiometric imaging device not necessarily required that the stand-off distance is measured just in time, it is according to an embodiment of the present invention preferred that the imaging device further comprises distance measurement means for measuring the distance between said scene and the radiometer. Such a simultaneous distance measurement of the stand-off distance increases the flexibility of the device. Referring to the above-mentioned example of the airport security scanner guiding gates would therefore no longer be necessary. Passengers could pass the detection area at any distance from the radiometer since each stand-off distance can be measured simultaneously by the proposed distance measurement means. The de-blur kernel used for the de-convolution is then adapted to the measured distance by incorporating the antenna pattern corresponding to this distance, so that an optimal de-blurring effect can be achieved which is exactly adapted to the actual situation.

According to another preferred embodiment the distance measurement means comprise one or more optical, radar based or acoustical distance measurement sensors. It has to be noted that also other conventional measurement techniques can be used without leaving the scope of the present invention. Laser distance measurement is, for instance, one of a variety of possible distance measurement techniques.

According to a further embodiment the de-blur kernel is determined by use of a measured or simulated antenna pattern of the radiometer corresponding to the actual distance between said scene and the radiometer (stand-off distance). In other words, the antenna pattern is in a first step either actually measured for the given stand-off distance or pre-computed in an appropriate (software) simulation (e.g. electro-magnetic or ray-tracing simulation). Using the knowledge of this distance-dependent antenna pattern a blur operator, also called point spread function (PSF), can be chosen respectively calculated. The respective stand-off distance-dependent de-blur kernel can then be calculated in a known mathematical operation. The blur kernel and the de-blur kernel are therefore derived from the antenna pattern and correspond precisely to the actual stand-off distance. By de-convoluting the acquired image data with this specially adapted de-blur kernel an improved imaging quality can be achieved.

According to another embodiment of the present invention, the radiometric imaging device further comprises a storage unit which stores a plurality of different de-blur kernels for use in the processor, wherein the de-blur kernels have been determined for measured or simulated radiation signals corresponding to different predetermined distances between said scene and the radiometer (stand-off distance). By including such a storage unit into the radiometric imaging device acquisition and processing time can be saved since the de-blur kernels needed for the de-convolution do no longer need to be simultaneously determined. Instead, the corresponding de-blur kernel can be loaded for each detected or known stand-off distance from the storage unit. In this case the processor is adapted to de-convolute the generated radiation signal by means of a de-blur kernel loaded from said storage unit which corresponds to the stand-off distance. The storage unit can either be made up of pre-computed antenna patterns obtained from electromagnetic field simulations of the employed antenna structure or it can contain data of measured antenna patterns. In case distance measurement means are provided as well, the stand-off distance is first precisely measured and then the de-blur kernel corresponding to said stand-off distance is loaded from the storage unit and used for the deconvolution of the acquired radiation signal.

According to a further embodiment the processor is configured to de-convolute said generated radiation signal by use of a distance-dependent de-blur kernel which is determined by interpolating between at least two de-blur kernels of said storage unit. This is especially advantageous if no de-blur kernel exists in the storage unit which exactly corresponds to the known, simulated, respectively measured stand-off distance. In this case, an appropriate de-blur kernel can be calculated by interpolating between the spatially closest de-blur kernels available in the storage unit. Of course, it is also possible to take only one de-blur kernel from the storage unit which is the spatially closest, without interpolating between two different deblur kernels. However, this will not result in an optimal image quality.

Further, according to another embodiment of the present invention, the radiometer device is adapted for detecting radiation emitted in a millimeter wavelength range, in particular in a wavelength range from 0.1 to 100 mm, preferably from 1 to 10 mm. As mentioned above, this frequency range has the ability to penetrate non-metal materials, including plastics, walls, clothes, smoke and fog, which is an important property for applications of the presented device and method. Particularly the achievable spatial resolution of few millimeters is very interesting in security applications like the detection of concealed weapons or explosives. Generally, the invention is also applicable for other frequency ranges. However, some frequencies are less or not usable due to atmosphere absorption properties (the propagation attenuation is too high to receive some useful signal).

Still further, according to an embodiment, the radiometric imaging device comprises illumination means configured to illuminate said scene with wideband radiation according to an illumination signal. These illumination means are especially necessary for an active radiometric imaging device, where the scene to be scanned is irradiated (illuminated) with millimeter waves and the image is created by detecting the waves transmitted or reflected from the scene. Such an active radiometer is, compared to a passive radiometer, less noise sensitive and has a higher signal to noise ratio. The presented de-convolution technique is, however, as already mentioned above, also applicable in the same way for such active radiometers.

According to another embodiment, the illumination means and the radiometer are combined in a monostatic radiometric unit or monostatic radar. In other words, the illumination means and the radiometer are combined to a monostatic active radar system, where the transmitting and receiving antenna are at the same position or implemented by the same common antenna.

According to another embodiment of the present invention, the device further comprises focusing means configured to focus the radiometer onto predetermined distances. Using such focusing means, the antenna pattern can be adapted to the corresponding stand-off distance, i.e. the radiometer can be focused to the corresponding stand-off distance. The presented de-convolution technique is in such cases primarily advantageous where the focusing means are only able to focus stepwise, meaning that they cannot continuously variable on every desired stand-off distance. If, for example, the focusing means can only focus either on a stand-off distance of 3 m or 4 m, but the object to be scanned is located at a stand-off distance of 3.5 m, the processor is able to de-convolute the generated radiation signal using a de-blur kernel which is exactly determined according to the actual stand-off distance of 3.5 m.

According to another aspect the present invention provides a radiometric imaging device for scanning a scene, said device comprising:
  means for detecting radiation in a predetermined spectral range emitted from said scene and for generating a radiation signal from said detected radiation, and
  means for processing said generated radiation signal by de-convoluting said generated radiation signal by use of a distance-dependent de-blur kernel, which is determined depending on the distance between said scene and the radiometer.

BRIEF DESCRIPTION OF THE DRAWINGS

These and other aspects of the present invention will be apparent from and explained in more detail below with reference to the embodiments described hereinafter. In the following drawings:

FIG. 8 shows a table including the results of an object detection probability simulation for different blur and de-blur kernel combinations.

DETAILED DESCRIPTION OF THE INVENTION

Figure 1:
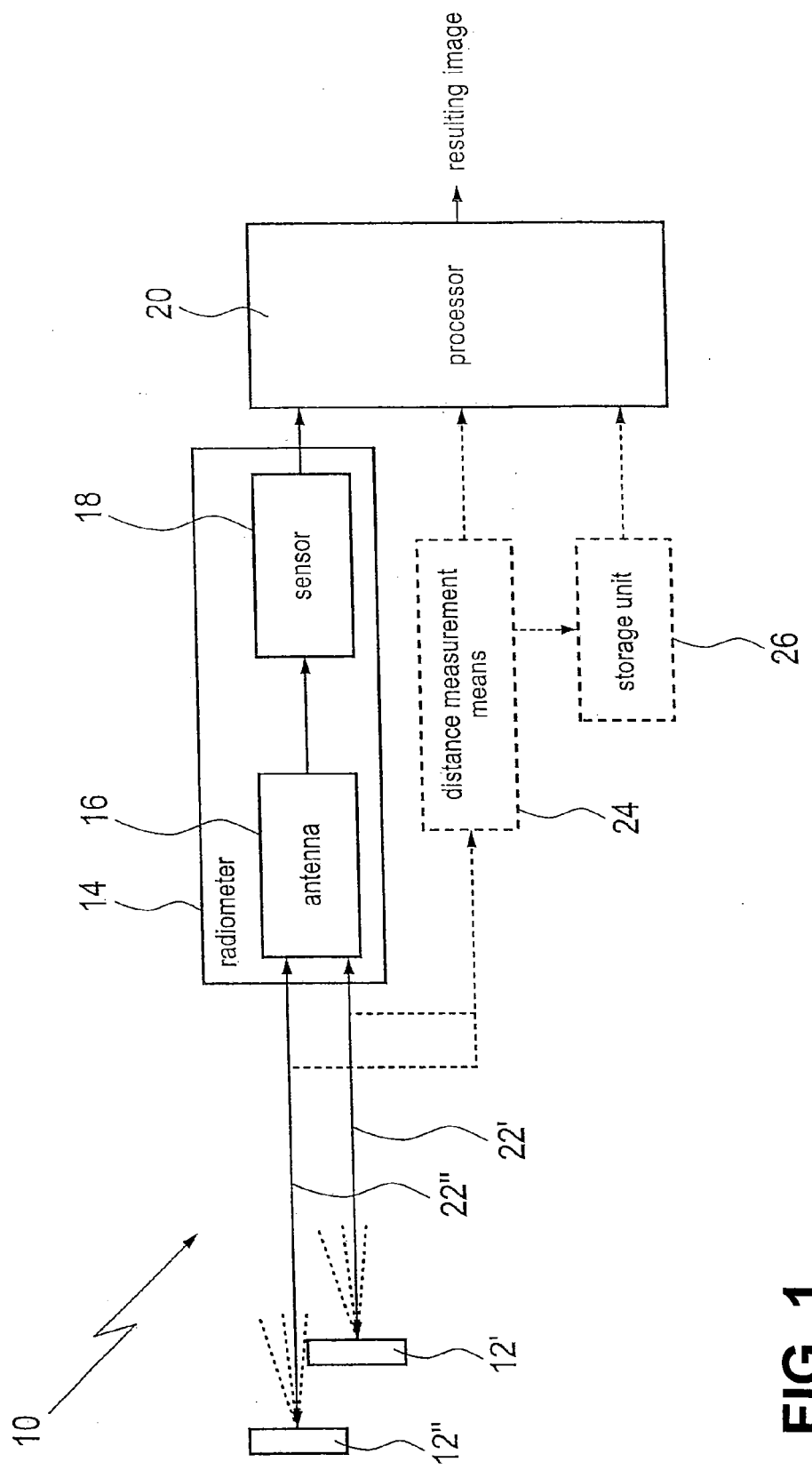
FIG. 1 shows a schematic block diagram illustrating a first embodiment of a radiometric imaging device according to the present invention.

FIG. 1 shows a schematic block diagram illustrating a first embodiment of a radiometric imaging device 10 according to the present invention. The radiometric imaging device 10 is used to image a scene, e.g. using millimeter wave imaging. For instance, said device 10 may be used to scan persons 12', 12" in front of a (e.g. neutral) background to detect if the person carries a concealed weapon. The device 10 comprises a radiometer 14 for detecting radiation in a predetermined spectral range emitted from said scene (persons 12', 12") and for generating a radiation signal from said detected radiation. The radiometer 14 generally comprises an antenna 16 and a radiometer sensor 18 for detecting the emitted radiation and for generating a radiation signal. The device 10 furthermore comprises a processor 20 which is configured to process said generated radiation signal to obtain a de-blurred image, in particular using a de-convolution. The device 10 may additionally comprise distance measurement means 24 for measuring the distance 22', 22" between said scene 12', 12" and the radiometer 14, which is usually called stand-off distance 22', 22", and a storage unit 26 comprising a plurality of different de-blur kernels for the de-convolution.

The presented radiometric imaging device 10 employs a new deconvolution technique which enables, compared to known millimeter wave imaging techniques, an improved image quality. According to this de-convolution technique, the processor 20 is configured to de-convolute the generated radiation signal by use of a de-blur kernel which is determined according to the actual stand-off distance 22', 22". This distance-dependent de-convolution represents a main advantage in the field of radiometric imaging, since it has been found that the detection pattern of the radiometer antenna 16 strongly depends on the stand-off distance 22', 22". In contrast to a conventional radiometric imaging system, where a constant deconvolution is used which is independent of the stand-off distance 22', 22", the resulting scanning images generated by the presented device 10 show much less blurring artifacts.

Figure 4:
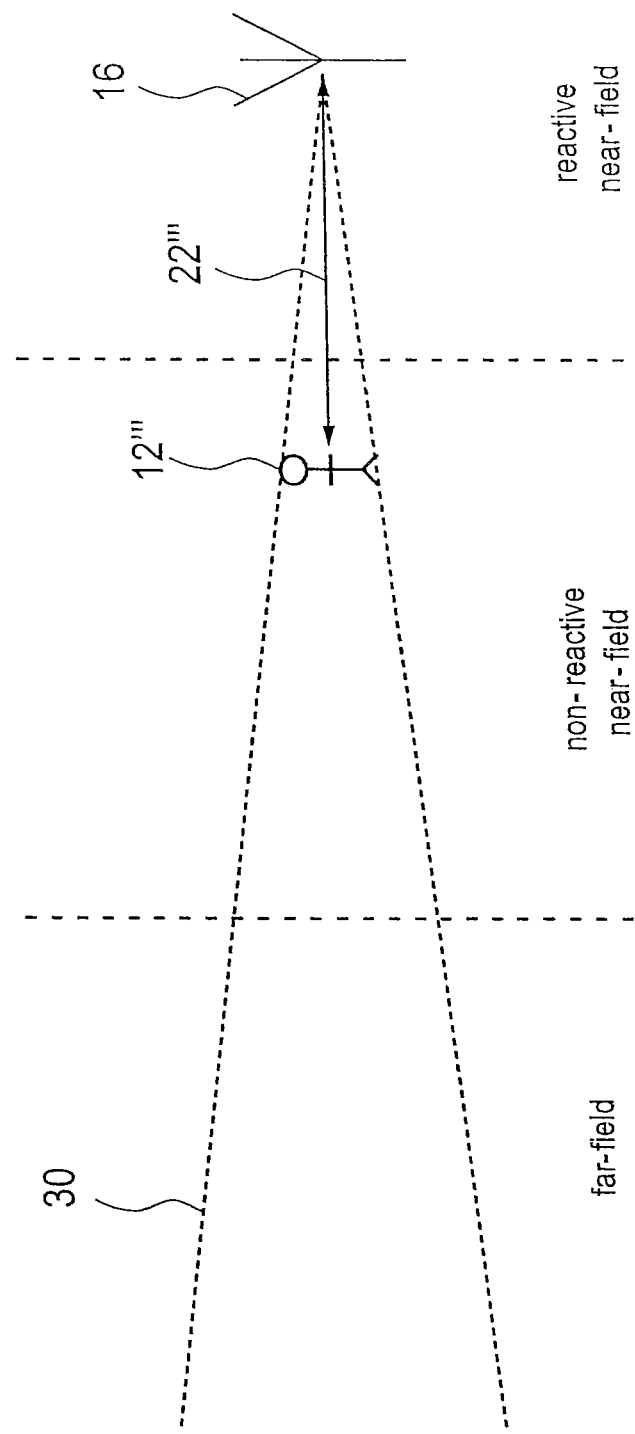

The effect of the distance-dependent de-convolution has shown to be even more advantageous, when the scanned object 12''' is located in the near-field region of the antenna detection area 30 (see FIG. 4), since in the non-reactive near-field region the antenna pattern varies even stronger over the stand-off distance 22'''.

The field regions of an antenna are usually separated in the reactive near-field, which reaches up to a distance of:

$$r_{NF} = 0.62\sqrt{\frac{D^3}{\lambda}}, \quad (1)$$

where D stands for the maximum antenna diameter and is the wavelength of the operating frequency in free space. In the reactive near-field no measurements can be carried out due to the interaction of the antenna and the object within this region. After the reactive near-field, there is the non-reactive near-field, to which this invention basically applies. In this field region the antenna pattern varies depending on the distance. The far-field region, in which antennas are usually operated, starts at $$r_{FF} = \frac{2D^2}{\lambda}. \quad (2)$$

In the far-field the antenna pattern is constant and does not change over the distance any more.

However, since high resolution millimeter wave sensors require high gain antennas 16 with an extremely sharp pencil beam 30, the scanned object 12''' is in the most practical cases located in the near-field region. The presented imaging device 10 therefore outperforms the known radiometric imaging devices in terms of image quality.

By including additional distance measurement means 24, which, for example, comprise optical or radar based measurement means, the stand-off distance 22', 22" of the objects to be scanned 12', 12" can be measured. However, it has to be noted that the distance measurement means 24 do not necessarily have to be included within the device 10 according to the present invention (the distance measurement means 24 are therefore illustrated with dashed lines). For example, it would also be conceivable that the persons to be scanned 12", 12' are scanned while walking through different gates which are located at known stand-off distances 22', 22".

However, independent of the fact whether the stand-off distance 22', 22" is measured or known, a corresponding distance-dependent de-blur kernel used for the de-convolution is in a second step calculated by the processor 20. Instead of calculating the de-blur kernel which corresponds to the measured stand-off distance 22', 22", the corresponding de-blur kernel can also be loaded from the storage unit 26. This storage unit 26 may comprise a plurality of different de-blur kernels which correspond to different stand-off distances. In case the storage unit 26 does not contain a de-blur kernel which corresponds exactly to the measured stand-off distance 22', 22", the processor 20 may either load a de-blur kernel from the storage unit 26 which corresponds to the spatially closest stand-off distance or the processor 20 may be adapted to interpolate between two or more de-blur kernels of said storage unit 26 which correspond to spatially close stand-off distances.

Figure 2:
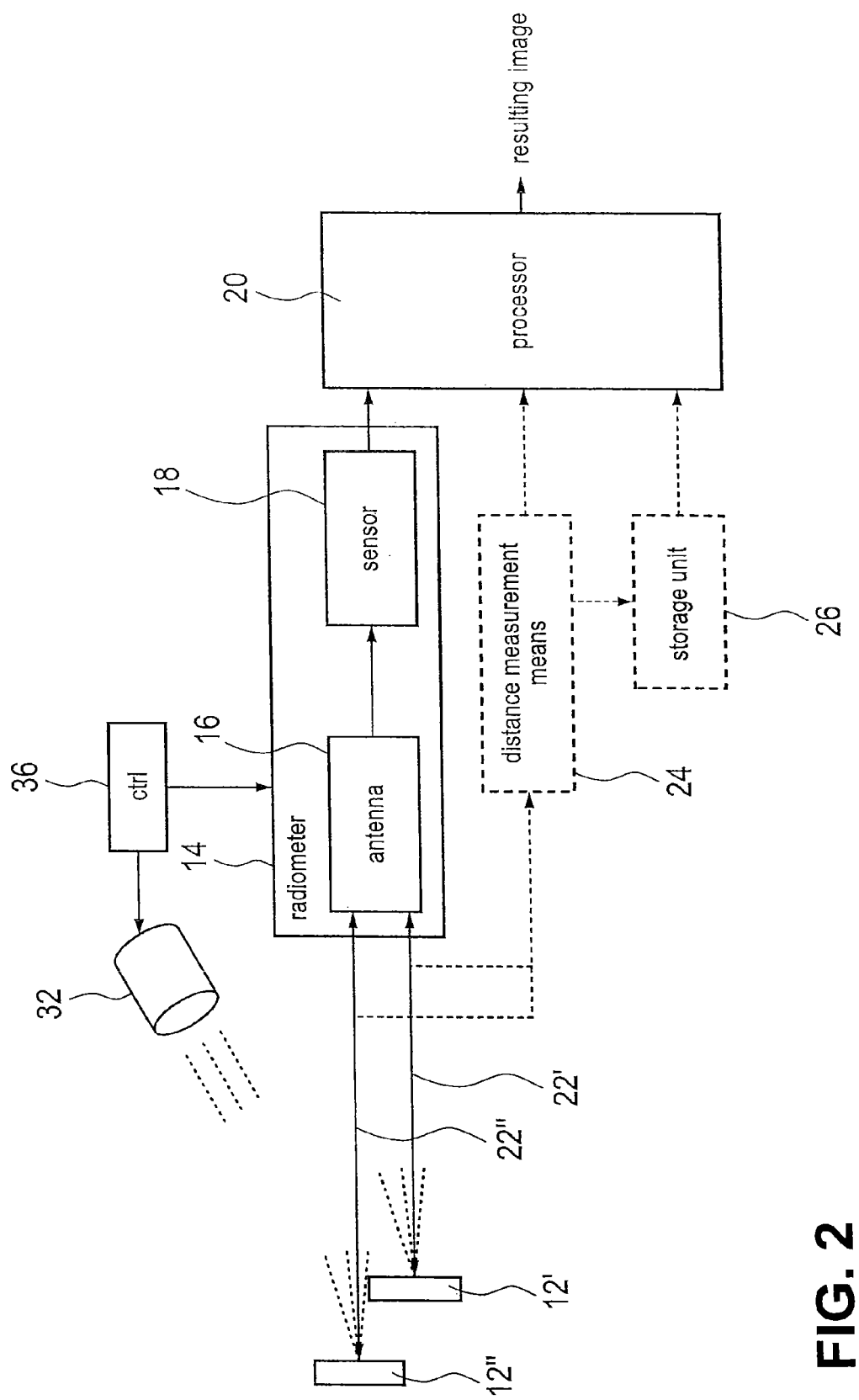
FIG. 2 shows a schematic block diagram illustrating a second embodiment of the radiometric imaging device according to the present invention.

It has to be noted that the presented radiometer 10 can be based on passive radiometry as well as on active radiometry. In contrast to the first embodiment, which is based on passive radiometry (shown in FIG. 1) detecting the millimeter waves emitted by the scanned persons 12', 12", FIG. 2 shows an active radiometric imaging device 10 according to a second embodiment of the present invention. This active radiometric imaging device 10 additionally comprises illumination means 32 configured to illuminate the scanned scene 12', 12" with radiation according to an illumination signal. The illumination means 32 are connected to the radiometer 14 via a control unit 36 which controls the activity of the illumination means 32 and/or the radiometer 14. Thus, the scene to be scanned 12', 12" is actively irradiated with millimeter waves and the antenna 16 detects the waves transmitted or reflected from the scene 12', 12". The active radiometric imaging device according to the second embodiment of the present invention (see FIG. 2) is, compared to the passive radiometric imaging device according to the first embodiment of the present invention (see FIG. 1), less noise sensitive and has a higher signal strength. The above-mentioned de-convolution technique, which represents the central gist of the invention, is, however, independent of whether an active or passive imaging device 10 is used. The general structure of the radiometric imaging device 10 according to the second embodiment is therefore the same and comprises the same remaining elements as the passive imaging device according to the first embodiment.

Figure 9:
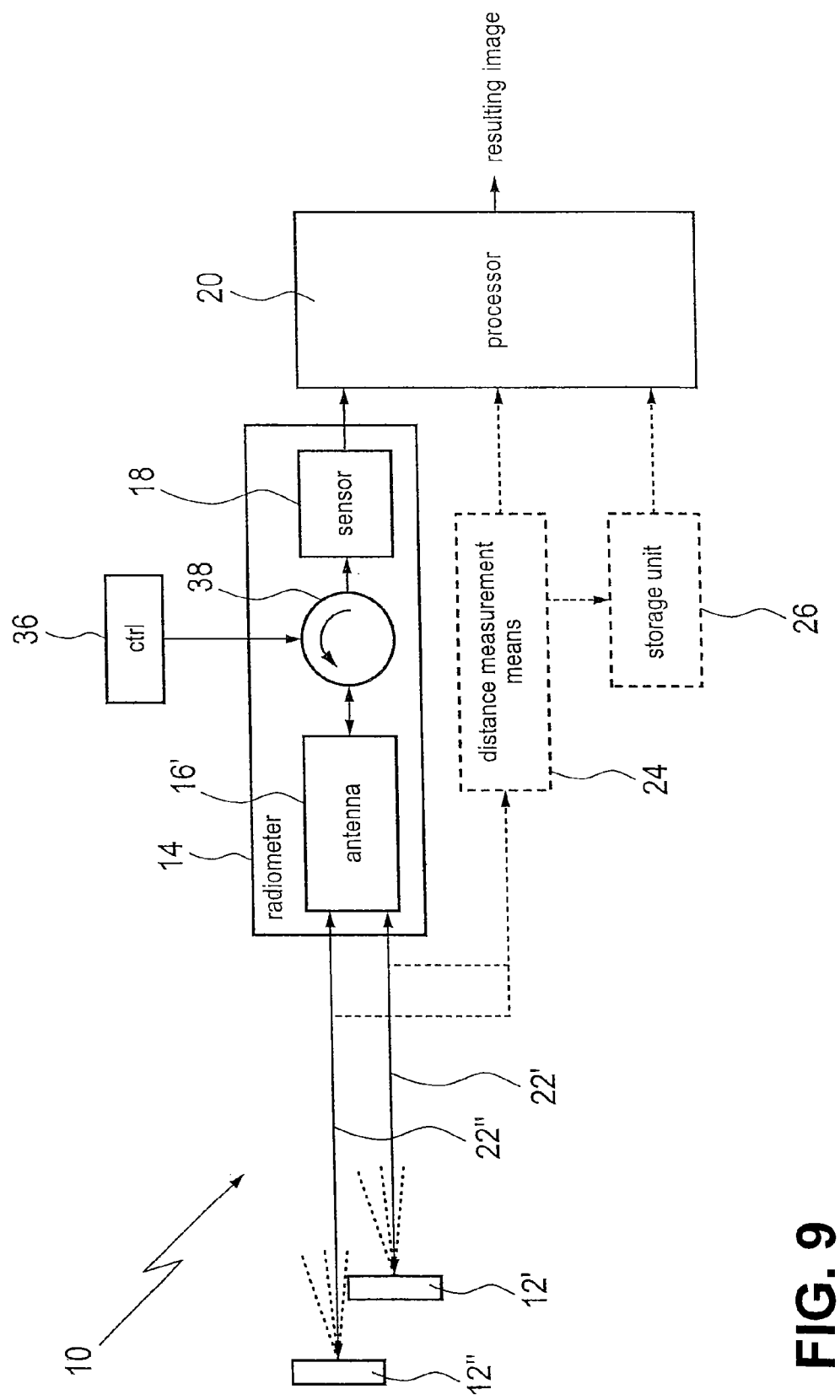
FIG. 9 shows a schematic block diagram illustrating a fourth embodiment of a radiometric imaging device according to the present invention.

It has to be noted that the deconvolution technique is also applicable to monostatic active radar systems, where the TX and RX antenna is at the same position. The processing is the same in this case. This embodiment of the present invention is shown in FIG. 9. Instead of separate illumination means a combined TX/RX-antenna 16' is used which is configured to illuminate the scanned scene 12', 12" with radiation according to an illumination signal as well as to detect the waves transmitted or reflected from the scene 12', 12". A switching unit 38 (e.g. a circulator) is configured to switch the antenna from a transmitting mode to a detection mode for different time intervals. In other words, the antenna 16' acts in one time interval as a transmitting antenna and in another time interval as a detection antenna.

The control unit 36 (which may also be regarded as a transmitter) is mainly provided for generating and/or controlling the generation and emission of the radiation for illumination by the antenna 16' in the transmission mode, but may also control the switching unit 38 and/or the complete radiometer 14. The switching unit 38 may also be implemented by other elements enabling the common use of a single antenna 16' for transmission and reception of radiation.

Figure 3:
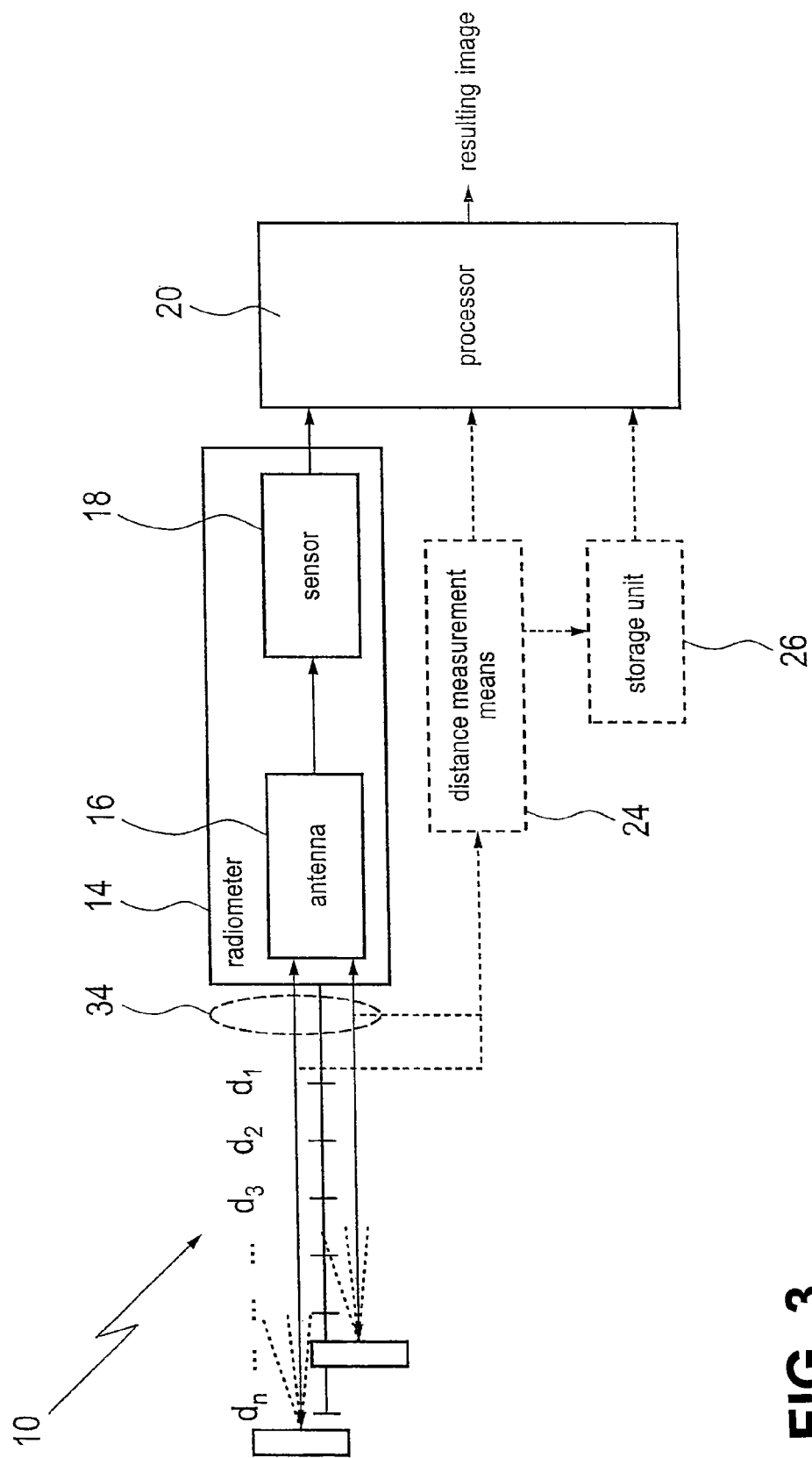
FIG. 3 shows a schematic block diagram illustrating a third embodiment of the radiometric imaging device according to the present invention, FIG. 4 schematically shows a detection field of a millimeter wave antenna according to the present invention.

FIG. 3 shows a schematic block diagram illustrating a third embodiment of the radiometric imaging device 10 according to the present invention. In this embodiment focusing means 34 are additionally provided. The focusing means 34 are configured to focus the radiometer onto predetermined distances. Thereby, the detection pattern of the antenna 16 can be adapted to the corresponding stand-off distance 22', 22" i.e. the radiometer 10 can be focused to the corresponding stand-off distance 22', 22". The de-convolution technique presented above is especially advantageous if the focusing means 34 are only able to focus stepwise, meaning that they cannot continuously focus on every desired stand-off distance 22', 22". In this case the processor 20 compensates for a slightly incorrect antenna focus by deconvoluting the generated radiation signal using a de-blur kernel which is exactly determined according to the actual stand-off distance 22', 22".

Figure 5:
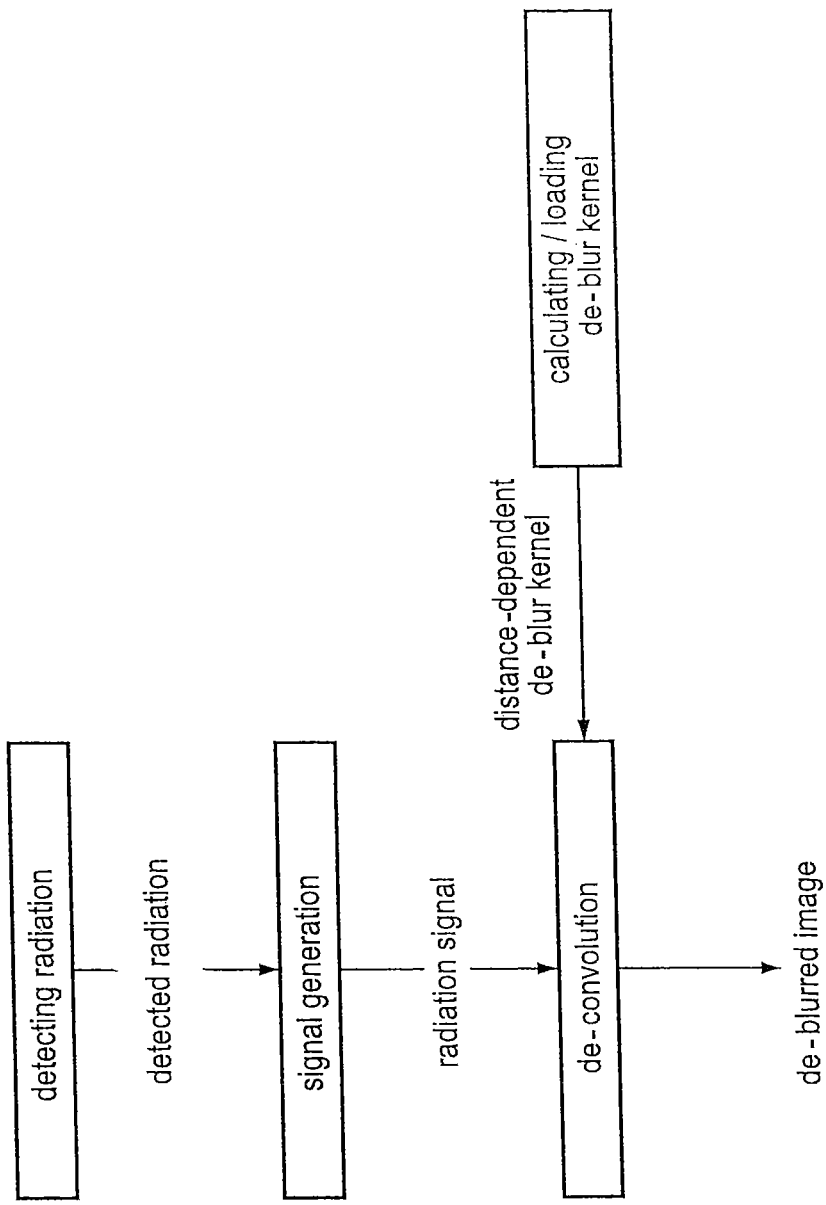
FIG. 5 shows a schematic block diagram illustrating a first embodiment of a radiometric imaging method according to the present invention.

FIG. 5 shows a schematic block diagram of the radiometric imaging method according to a first embodiment of the present invention. Therein, the above mentioned radiometric imaging technique is illustrated again in detail. According to this method the radiation emitted in a predetermined spectral range, preferably in a millimeter wavelength range from 0.1 to 100 mm, is in a first step detected from the imaged object. In a second step, a radiation signal is generated from said detected radiation. The radiation signal is then de-convoluted by use of a distance-dependent de-blur kernel which is either directly calculated or loaded from a storage unit depending on the actual stand-off distance, so that finally a de-blurred image is obtained.

Figure 6:
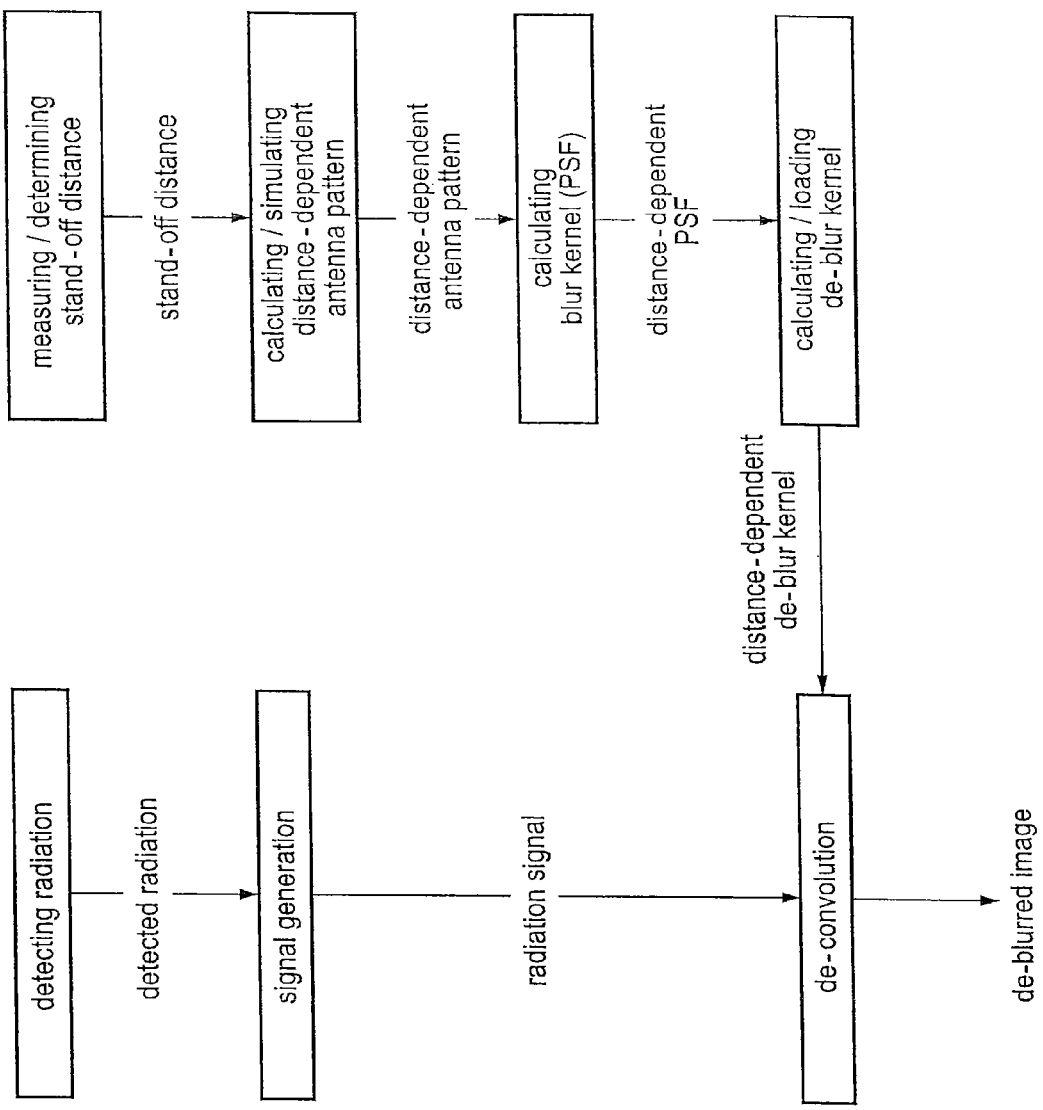
FIG. 6 shows a schematic block diagram illustrating a second embodiment of the radiometric imaging method according to the present invention.

In contrast thereto, the presented method comprises according to the second embodiment shown in FIG. 6, some additional steps, which mainly refer to the determination of the distance-dependent de-blur kernel. In order to determine the de-blur kernel, the stand-off distance 22', 22" is in a first step either measured, e.g. by use of the above mentioned distance measurement means 24, or determined, e.g. by use of guiding gates as explained in the example above. Then, the detection pattern of the antenna 16 ("antenna pattern") is in a second either actually measured for the given stand-off distance 22', 22" or pre-computed in an appropriate software simulation. With the knowledge of this distance-dependent antenna pattern a blur operator, also called point spread function (PSF), can be calculated. The respective stand-off distance-dependent de-blur kernel can then be calculated in a known mathematical operation (by inversion). The blur kernel and the de-blur kernel are therefore derived from the antenna pattern and correspond precisely to the actual stand-off distance 22', 22". By de-convoluting the acquired image data with this specially adapted de-blur kernel a very high imaging quality can be achieved.

Figure 7:
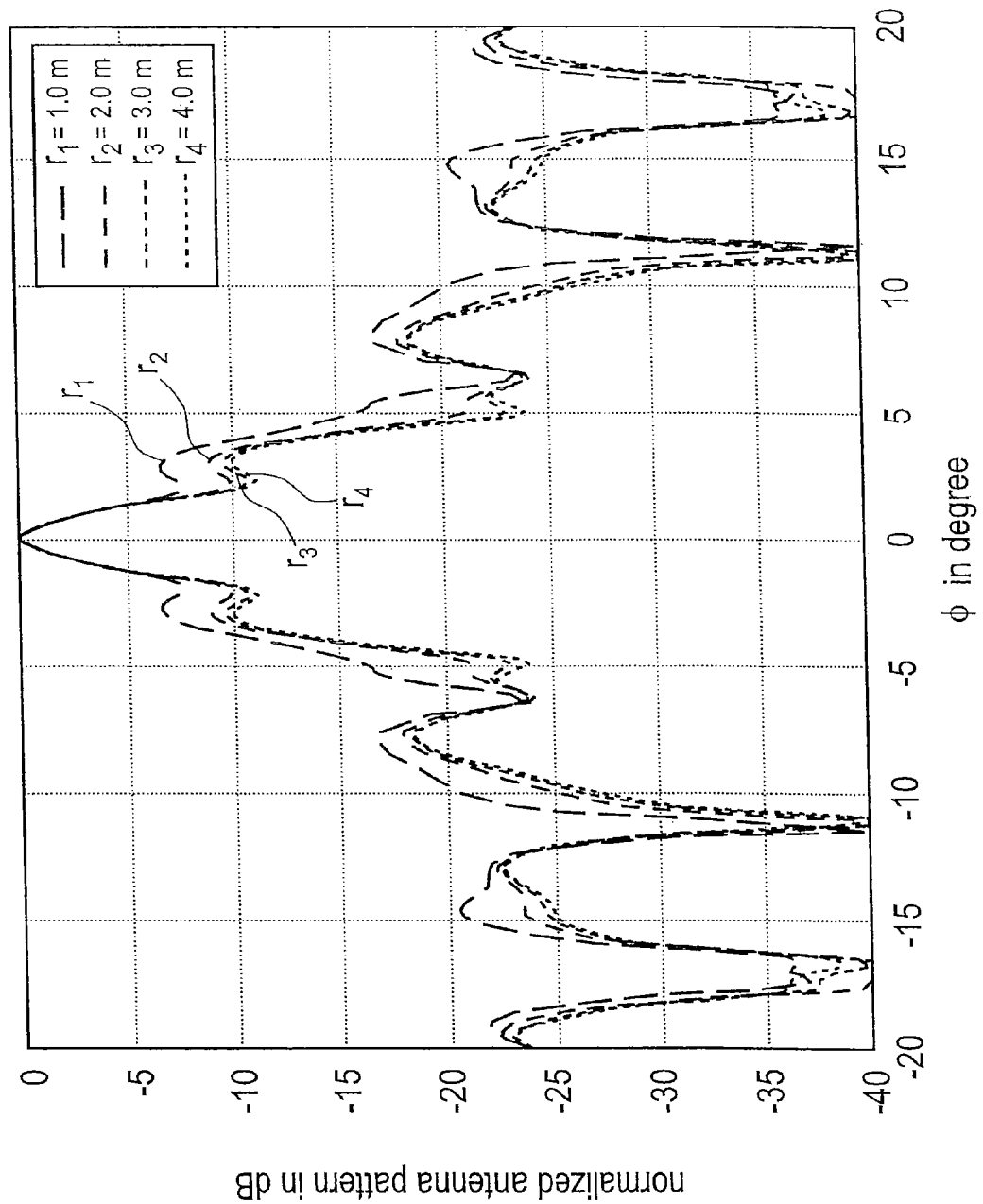
FIG. 7 shows a diagram illustrating a simulation of four exemplary antenna patterns at different stand-off distances.

A constant, distance independent de-convolution would not be appropriate and would result in a blurred image especially for short stand-off distances 22', 22". This fact as well as the advantage of the proposed adaptive de-convolution technique can be seen in FIGS. 7 and 8. FIG. 7 shows exemplary antenna patterns of a lens antenna of 26 λ diameter at different stand-off distances 22', 22" ranging from 1 m to 4 m. It can be seen that the antenna pattern for $r_1$=1 m severely differs from the other antenna patterns calculated respectively simulated for the larger stand-off distances 22', 22" ($r_2$-$r_4$).

This effect is even more obvious in the table shown in FIG. 8, where the detection probabilities of different convolution and de-convolution combinations are given for a specific scene, noise level and Wiener de-convolution based on the antenna patterns shown in FIG. 7. The degradation in detection probability, in case the convolution pattern differs from the de-convolution pattern, can be clearly seen, especially for the antenna pattern at a stand-off distance of 1 m. Even if in the case of a stand-off distance and corresponding convolution of 1 m a de-blur kernel is used which corresponds to a stand-off distance of 2 m, the detection probability degrades to only 3%. This degradation is of course less significant for higher stand-off distances 22', 22", since the antenna pattern varies less with the stand-off distance in the far-field. However, it has to be noted that the example shown in the table of FIG. 8 only refers to a specific example considering a special noise level, a special scene, a special temperature distribution, etc.

In summary, a radiometric imaging device and corresponding method are proposed which use a distance-dependent de-convolution and thereby lead to a very good imaging quality. The invention presents a device and method for improving the acquired picture quality by using an appropriate de-blur kernel which is determined depending on the stand-off distance between the radiometer and the imaged object. Since the antenna pattern strongly varies over this stand-off distance, the proposed adaptive de-convolution leads to a much better imaging quality compared to known radiometric imaging approaches. Even though the presented idea is particularly directed to millimeter wave radiometry, the invention is not limited to any specific frequency range.

The invention has been illustrated and described in detail in the drawings and the afore-going description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable storage medium, such as an optical storage medium or solid-state medium supply together with or as part of other hardware, but may also be distributed in other forms, such as via the internet or other wired or wireless telecommunication systems.

Any reference signs in the claims should not be construed as limiting the scope.

The invention claimed is:

1. A radiometric imaging system comprising:
   a plurality of security gates;
   a radiometer configured to detect radiation in a predetermined spectral range emitted from a scene including the plurality of security gates, and to generate a radiation signal from said detected radiation;
   a processor configured to process said generated radiation signal by de-convoluting said generated radiation signal by use of a distance-dependent de-blur kernel that is determined according to a distance between the radiometer and at least one of the gates included in the plurality of security gates; and
   a storage medium which stores a plurality of different de-blur kernels to be used by the processor, wherein
   the plurality of de-blur kernels stored in the storage medium have been determined for measured or simulated radiation signals corresponding to different predetermined distances between individual gates, of the plurality of security gates, and the radiometer.

2. The radiometric imaging system as claimed in claim 1, wherein the plurality of security gates are arranged in a common location.

3. The radiometric imaging system as claimed in claim 1, wherein the processor is configured to determine the plurality of different de-blur kernels for measured or simulated radiation signals corresponding to the different predetermined distances.

4. The radiometric imaging system as claimed in claim 1, wherein the distance-dependent de-blur kernel is an inversion of a point spread function.

5. The radiometric imaging system as claimed in claim 1, wherein:
the radiation is millimeter radio wave radiation, and
the radiometer includes an antenna to receive the radiation and a radiometer sensor to detect the radiation received by the antenna and to generate the radiation signal.

6. The radiometric imaging system as claimed in claim 5, wherein the processor is configured to calculate a point spread function based on a distance-dependent antenna pattern of the antenna of the radiometer.

7. The radiometric imaging system as claimed in claim 1, further comprising:
one or more sensors to measure the distance between said scene and the radiometer.

8. The radiometric imaging system as claimed in claim 7, wherein the one or more sensors comprise at least one of an optical, a radar, or an acoustical distance measurement sensor.

9. The radiometric imaging system as claimed in claim 1, wherein said de-blur kernel is determined based on a measured or simulated antenna pattern of the radiometer corresponding to the actual distance between the radiometer and at least one of the gates included in the plurality of security gates.

10. The radiometric imaging system as claimed in claim 1, wherein the processor is configured to de-convolute said generated radiation signal by use of a distance-dependent de-blur kernel which is determined by interpolating between at least two de-blur kernels stored in the storage medium.

11. The radiometric imaging system as claimed in claim 1, wherein said radiometer is configured to detect radiation emitted in a millimeter wavelength range of 0.1 to 100 mm.

12. The radiometric imaging device as claimed in claim 1, further comprising:
a radio wave transmitter that illuminates said plurality of security gates with radio wave radiation according to an illumination signal.

13. The radiometric imaging system as claimed in claim 12, wherein the radio wave transmitter and the radiometer are combined in a monostatic radiometric unit or monostatic radar.

14. The radiometric imaging system as claimed in claim 1, wherein the radiometer is configured to be focused onto predetermined distances.

15. The radiometric imaging system as claimed in claim 14, wherein the radiometer is configured to be focused based on stepwise changes in the distance between at least one of the gates included in the plurality of security gates and the radiometer.

16. The radiometric imaging system as claimed in claim 12, wherein the wavelength range is 1 to 10 mm.

17. The radiometric imaging system as claimed in claim 12, wherein the transmitter includes at least one antenna.

18. A radiometric imaging method for scanning a scene, said method comprising:
detecting, by a radiometer, radiation in a predetermined spectral range emitted from said scene including a plurality of security gates,
generating, by the radiometer, a radiation signal from said detected radiation,
processing, by a processor, said generated radiation signal by de-convoluting said generated radiation signal with a distance-dependent de-blur kernel that is determined according to a distance between the radiometer and at least one of the gates included in the plurality of security gates, and
storing, by a storage medium, a plurality of different de-blur kernels to be used by the processor, wherein
the plurality of de-blur kernels stored in the storage medium have been determined for measured or simulated radiation signals corresponding to different predetermined distances between individual security gates, of the plurality of security gates, and the radiometer.

19. A non-transitory computer readable medium having instructions stored thereon which, when executed by one or more processors, cause a radiometric imaging device including a radiometer to perform the method as claimed in claim 18.

* * * * *